US011201811B2

(12) United States Patent
Schimke et al.

(10) Patent No.: US 11,201,811 B2
(45) Date of Patent: Dec. 14, 2021

(54) MULTIPORT NETWORK ADAPTER LOOPBACK HARDWARE

(71) Applicant: International Business Machines Corporation, Armonk, NY (US)

(72) Inventors: Timothy J. Schimke, Stewartville, MN (US); John Wesley Walthour, II, Austin, TX (US); Prathima Kommineni, Hyderabad (IN); Syed Ataur Rehman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 16/355,908

(22) Filed: Mar. 18, 2019

(65) Prior Publication Data

US 2020/0304395 A1 Sep. 24, 2020

(51) Int. Cl.
*H04L 12/26* (2006.01)
(52) U.S. Cl.
CPC .............. *H04L 43/12* (2013.01); *H04L 43/50* (2013.01)
(58) Field of Classification Search
CPC ..... H04L 43/50; H04L 45/18; H04L 43/0864; H04L 12/4641; H04L 1/243; H04L 43/12
See application file for complete search history.

(56) References Cited

U.S. PATENT DOCUMENTS

| 6,550,029 | B1 | 4/2003 | Bailey et al. |
| 7,017,087 | B2 | 3/2006 | Panis et al. |
| 7,085,238 | B2 | 8/2006 | McBeath |
| 7,519,004 | B1 | 4/2009 | Kamity et al. |
| 7,864,691 | B2 | 1/2011 | Deragon et al. |
| 8,086,915 | B2 | 12/2011 | Bodrozic et al. |
| 9,313,093 | B2 | 4/2016 | Jadav et al. |
| 9,344,328 | B1 | 5/2016 | Bishara |
| 9,473,381 | B2 | 10/2016 | Kahkoska |
| 9,600,309 | B2 | 3/2017 | Prawer et al. |
| 9,894,517 | B2 | 2/2018 | Preda et al. |
| 2002/0144187 | A1* | 10/2002 | Morgan ................. H04L 41/06 714/43 |
| 2004/0143781 | A1* | 7/2004 | DiMambro ......... G06F 11/2221 714/716 |

(Continued)

FOREIGN PATENT DOCUMENTS

DE 202007004303 U1 6/2007

OTHER PUBLICATIONS

Renbi et al., "Application of Contactless Testing to PCBs with BGAs and Open Sockets", J Electron Test (2015), DOI 10.1007/s10836-015-5535-3, Published online: Aug. 19, 2015, 9 pages.

*Primary Examiner* — Atique Ahmed
(74) *Attorney, Agent, or Firm* — Nolan M. Lawrence

(57) ABSTRACT

An instruction directed towards a network adapter is detected. Based on the detected instruction it is determined that the network adapter should operate in a loopback mode. One or more network signals are transmitted through a dedicated loopback pathway. The transmission is based on the determination. The transmission occurs on a first network interface of the network adapter. The dedicated loopback pathway connects to a second network interface of the network adapter. Listening on the dedicated loopback pathway for the one or more network signals. Performing a network loopback test of the network adapter based on the listening.

20 Claims, 5 Drawing Sheets

(56) References Cited

U.S. PATENT DOCUMENTS

| | | | |
|---|---|---|---|
| 2005/0099832 A1* | 5/2005 | Becker | G01R 31/31719 |
| | | | 365/52 |
| 2005/0165938 A1* | 7/2005 | Cornett | H04L 49/90 |
| | | | 709/229 |
| 2006/0167973 A1* | 7/2006 | Ra | G06F 16/2358 |
| | | | 709/203 |
| 2007/0248020 A1* | 10/2007 | Hoque | H04L 43/50 |
| | | | 370/249 |
| 2008/0071982 A1* | 3/2008 | Kanno | G06F 3/0632 |
| | | | 711/112 |
| 2008/0159157 A1* | 7/2008 | Nair | G06F 13/385 |
| | | | 370/249 |
| 2010/0262877 A1* | 10/2010 | Narayan | G01R 31/318572 |
| | | | 714/727 |
| 2012/0294313 A1* | 11/2012 | Mitsuhashi | H04L 45/54 |
| | | | 370/401 |
| 2014/0181459 A1* | 6/2014 | Venkumahanti | G06F 12/1027 |
| | | | 711/207 |
| 2015/0261635 A1 | 9/2015 | Hayes | |
| 2016/0373251 A1* | 12/2016 | Kumar | H04W 12/069 |
| 2017/0163547 A1 | 6/2017 | Xiong et al. | |
| 2018/0095844 A1* | 4/2018 | Pappu | G06F 11/1625 |

\* cited by examiner

MULTIPORT NETWORK ADAPTER LOOPBACK HARDWARE

BACKGROUND

The present disclosure relates to network adapters, and more specifically, to diagnosing network adapters by utilizing on-board dedicated hardware.

Network adapters may be used in computers such as desktop Personal Computers (PCs) and servers. Network adapters provide network access to other computers and networks. Network adapters also provide communication channels to other devices such as network attached peripherals.

SUMMARY

According to embodiments of the present disclosure, a method is disclosed. An instruction directed towards a network adapter is detected. Based on the detected instruction it is determined that the network adapter should operate in a loopback mode. One or more network signals are transmitted through a dedicated loopback pathway. The transmission is based on the determination. The transmission occurs on a first network interface of the network adapter. The dedicated loopback pathway connects to a second network interface of the network adapter. Listening on the dedicated loopback pathway for the one or more network signals. Performing a network loopback test of the network adapter based on the listening.

According to another aspect, embodiments disclose a system. A memory contains one or more instructions. A processor is communicatively coupled to the memory. An instruction directed towards a network adapter is detected. Based on the detected instruction it is determined that the network adapter should operate in a loopback mode. One or more network signals are transmitted through a dedicated loopback pathway. The transmission is based on the determination. The transmission occurs on a first network interface of the network adapter. The dedicated loopback pathway connects to a second network interface of the network adapter. Listening on the dedicated loopback pathway for the one or more network signals. Performing a network loopback test of the network adapter based on the listening.

According to yet another aspect, embodiments disclose a computer program product. Program instructions are embodied on a computer readable storage medium. An instruction directed towards a network adapter is detected. Based on the detected instruction it is determined that the network adapter should operate in a loopback mode. One or more network signals are transmitted through a dedicated loopback pathway. The transmission is based on the determination. The transmission occurs on a first network interface of the network adapter. The dedicated loopback pathway connects to a second network interface of the network adapter. Listening on the dedicated loopback pathway for the one or more network signals. Performing a network loopback test of the network adapter based on the listening.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
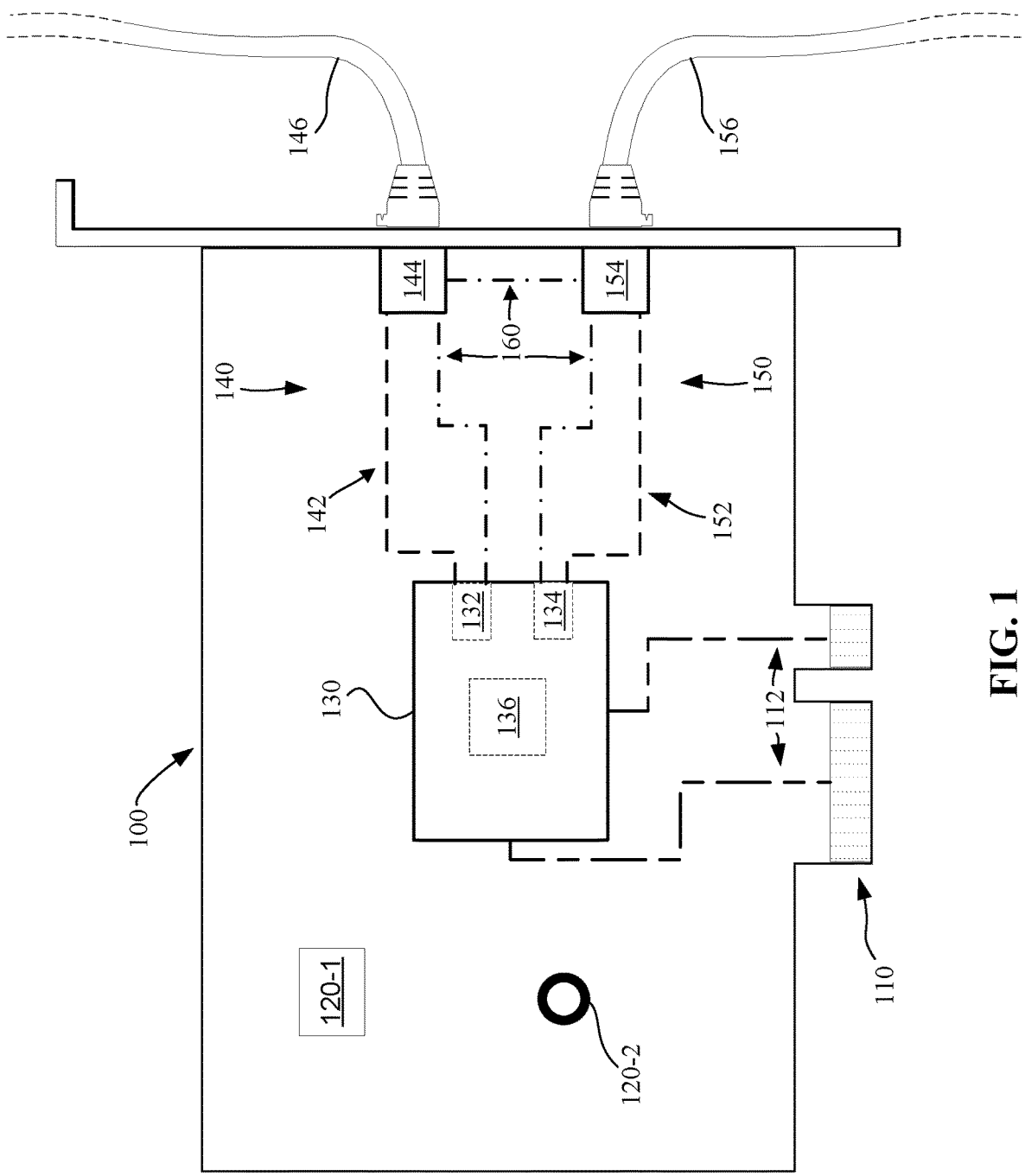
FIG. 1 depicts an example network adapter configured to provide network testing consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to network adapters; more particular aspects relate to diagnosing network adapters by utilizing on-board dedicated hardware. While the present disclosure is not necessarily limited to such applications, various aspects of the disclosure may be appreciated through a discussion of various examples using this context.

Network adapters can provide computers and other devices with the capability to communicate with one another. Network adapters function by providing connectivity to a local area network using one or more protocols, such as Ethernet or Wi-Fi. In some situations, network adapters provide peripherals connectivity through one or more busses, such as a serial bus (e.g., PCI-E) or a parallel bus. Network adapters are also known as network interface controller, network interface card, LAN adapter, or physical network interface.

Network adapters may receive, alter, generate, and transmit communication units. For example, a given network adapter includes one or more controllers that perform a variety of operations on a stream of communication. The stream of communication may be made of a variety of datagrams (e.g., data segments, data packets, packets, frames, headers, cells, chips, etc.). These controllers can operate by formatting, receiving, or sending the units of communication from the stream of communication. The units of communication may be data from one or more computer systems, such as network packets. The units of communication may be a portion of one or more layers of a network model (e.g., the datalink layer or the physical layer of the Open Systems Interconnection model). In some embodiments, the communication units are generated by the controllers (e.g., the analog signals of the physical layer).

Network adapters can take the form of a dedicated expansion card or daughter card with components dedicated to providing a network connection. A network adapter can take the form of a dedicated chip with other components that provide separate functions (e.g., a network chip on the mainboard or motherboard of a desktop computer). In some circumstances, network adapters take the form of logic embedded into other multi-purpose chips (e.g., a network interface built into the south bridge chip of a motherboard of a desktop computer). In some circumstances, network adapters are multiple components (e.g., a media access control connected to an external physical layer chip through a media-independent interface).

In some situations, a network adapter includes a network interface for connecting the network card to the network (alternatively, network connection). The network interface often includes the following: a series of physical traces or network pathways printed onto a circuit board; a network socket (alternatively, network port or network jack) integrally coupled to the circuit board and communicatively coupled to the network pathways, and a network cable including a network plug exterior to the network adapter, that when physically connected to the network socket communicatively couples the network adapter to the network. The network socket and network plug may utilize specific predetermined connector hardware (e.g., BNC connector, AUI connector, 6P6C connector, 8P8C connector).

Increasingly, network adapters are configured with multiple network interfaces. These multiport or multi-interface network adapters allow for increased connectivity to multiple disparate network connections simultaneously. This increased functionality has led to the adoption of multiport network adapters in many usage scenarios. For example, motherboards designed for workstation use are configured with two network interfaces. In another example, desktop computers have an expansion card with two network interfaces. In yet another example, a rack-mount server may have an expansion card with five network interfaces. In each of the above examples, the network interfaces are physically separate network interfaces and do not share any network connection to each other. For instance, network adapters with multiple interfaces have a first set of traces and a first network socket for attachment of a first network cable, and a second set of traces and a second network socket for attachment of a second network cable.

In some situations, the increased complexity of network adapters has created a need for more sophisticated testing. Multiport network adapters can be validated or tested by ensuring that network traffic flows properly through each of the network interfaces. This may be accomplished by some form of testing of a single network interface individually. For example, the traces and pathways of a first network interface may include a transmit and a receive pathway for sending and receiving network packets, respectively. The downsides and issues related to this are that only a subset of network tests may be performed through a single network interface (e.g., only specific network packets that are designed for specific tests, packets that are unlike active network traffic, traffic designed solely for loopback testing). Further issues are that some loopback testing may occur, but this does not test the entirety of the network interface (e.g., the network sockets themselves and the related physical traces). In addition, this only tests a single network interface, and the test must be repeated for each network interface of a multiport network adapter.

An external network device may be used with a multiport network adapter to perform network testing. Using an external network device, however, often leads to more issues. Dedicated external hardware, such as a switch or router may not be physically present in a datacenter for testing. Even if dedicated external hardware is present, there may be issues of access, such as a network technician not having the proper credentials to perform network testing utilizing a switch or router. Further problems can arise in that the dedicated external network hardware may be busy performing other network activity and create a situation where available windows for using such hardware is rare. Finally, external network devices may not be able to perform the testing even if they were available and a technician had access to them.

A network cable may be used with a multiport network adapter to perform network testing. Using a physical network cable also has multiple drawbacks. For instance, a network cable may not be available on site. Second, the network cable may need to be specialized (e.g., a crossover cable, a loopback cable) in some fashion and a technician may not have the requisite crimp cables to create such a cable on site. Further, there is also the issue of access: a technician needs physical access to the datacenter and she may not have such access during times when network tests are permitted to be performed (e.g., off hours, weekends). Lastly, switching a network cable may be impossible given the amount of time allotted to perform network testing. For example, some networks are so active that sometimes there may only be one or two seconds (or less) for performing a network test and a technician may not feasibly be able to unplug two cables and plug in a specialized network cable and then imitate the network testing and then re-plug in the original two cables given the limited amount of available time.

Dedicated testing hardware may provide additional functionality and solve the technical drawbacks for testing multiport (alternatively, multiple-interface or multi-interface) network adapters. In some embodiments, the dedicated testing hardware is built directly into the multiport network adapters. The dedicated testing hardware includes a dedicated network pathway for the performance network testing of the network adapter. The dedicated network pathway may be a dedicated loopback pathway. The dedicated network pathway may be somewhat separate from any of the other network interfaces. In some embodiments, the dedicated testing hardware is entirely separate from any of the other network interfaces or network pathways of the multiport network adapter. For example, the dedicated testing hardware includes a plurality of network pathways that are not shared with any other network interface or network pathway of the multiport network adapter. The dedicated network pathways of the dedicated testing hardware are configured to tie multiple network interfaces together. For example, the dedicated network pathways may link a first network interface's transmit and receive pathways to a second network interface's receive and transmit pathways, respectively.

The dedicated testing hardware may also include a security or authentication component to prevent unauthorized access to the dedicated network pathway. For example, the dedicated testing hardware may be inactive by default and the multiport network adapter may only provide access to the dedicated testing hardware in response to an authenticated entity. The dedicated testing hardware may be built wholly or partially into a network controller of the network adapter or may be wholly or partially located in a separate logical controller or application specific integrated circuit (ASIC), or a combination of network controller components. The dedicated testing hardware may be responsive to commands input from a host computer, such as from an operating system, hypervisor, or adjunct component of the hypervisor.

The dedicated testing hardware enables more and varied network tests to be performed. For example, a given technician may perform tests directly by issuing commands from the host computer. In some embodiments, a technician performs tests indirectly, by issuing commands from a terminal, smartphone, or other device from a remote geographic location. In another embodiment, a device driver developer of the network adapter may also initiate testing through one or more driver or operating system commands, either locally or remotely, without requiring physical access to the network adapter. The dedicated testing hardware enables the use of normal network traffic to be used for network testing. The dedicated testing hardware enables the use of the entirety of network tests including loopback, bandwidth, and responsiveness tests and allows for determining the status of a physical and link layer suits. The dedicated testing hardware also provides increased flexibility for network tests. For example, the dedicated testing hardware may enable testing of network hardware more often with setup, testing, and reconfiguration, (e.g., in a few seconds, in less than a second). In another example, dedicated testing hardware may allow for network tests to be scripted at off hour times, or during lulls in network activity. The test scripts can be built into driver code, or network adapter firmware, such that the network adapter can be tested without any additional software or without initial network connectivity.

Figure 5:
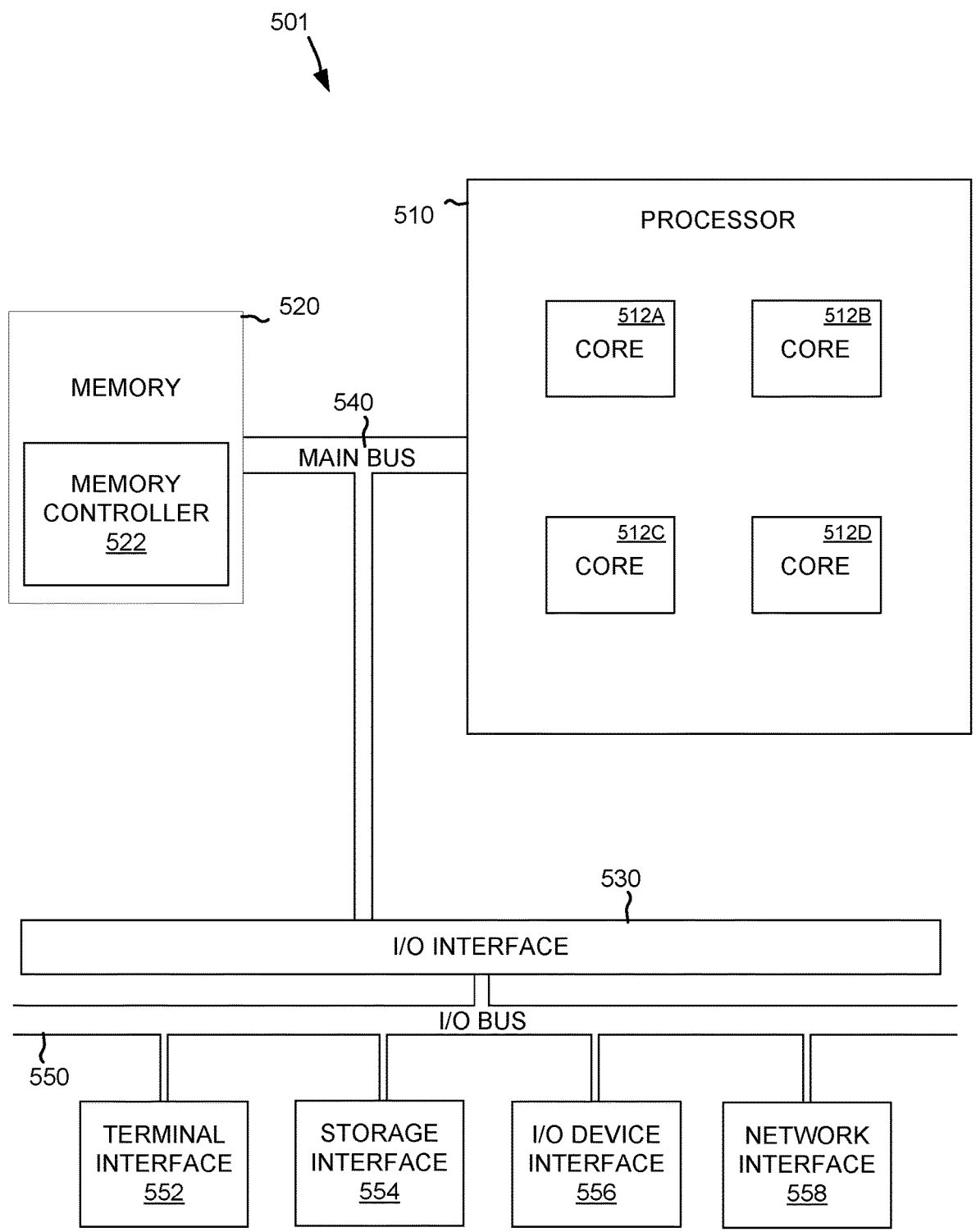
FIG. 5 depicts the representative major components of an example computer system that may be used, in accordance with embodiments of the present disclosure.

FIG. 1 depicts an example network adapter 100 configured to provide network testing consistent with embodiments of the present disclosure. The network adapter 100 includes dedicated testing hardware and operates both in an active network mode and a testing mode. The network adapter 100 is in the form of an expansion card on a printed circuit board (PCB) for receipt by a host computer (alternatively, computer, computer system, or host system). In some embodiments, a network adapter is integrally coupled to and forms part of a mainboard PCB along with a host computer. FIG. 5 describes an example computer system consistent with embodiments. The network adapter 100 includes the following: a system connector 110, one or more system pathways 112, hardware components 120-1 and 120-2 (collectively 120), and a network adapter controller (alternatively, adapter controller or network controller) 130. The network adapter 100 is a multiport network adapter and includes a first network interface 140 and a second network interface 150. In some embodiments, more interfaces (e.g., three separate network interfaces, four discrete network interfaces) comprise the network adapter 100.

The system connector 110 of the network adapter 100 includes one or more physical contacts to couple the network adapter to a host system. The system connector 110 may include one or communication lanes (e.g., buses, pathways) configured to send and receive data from a host system. The system connector 110 may also include one or more power lanes configured to receive power for the components of the network adapter 100. The power may be provided by the host system. In some embodiments, the network adapter 100 receives power in another manner, such as through a dedicated internal or external power connector (not depicted).

The one or more system pathways 112 of the network adapter 100 are physical traces that serve to electrically couple the system connector 110 to the network controller 130. The system pathways 112 may also include additional pathways (not depicted) that electrically couple to the hardware components 120. The system pathways 112 may be configured to transmit power from the system connector 110 to the network controller 130 and/or the hardware components 120. The system pathways 112 may be configured to transmit communication to the system connector 110, the network controller 130, and/or the hardware components 120. The system pathways 112 may also be configured to transmit communications from the network controller 130 and/or the hardware components 120 to the system connector 110.

The hardware components 120 of the network adapter 100 include a first hardware component 120-1 and a second hardware component 120-2. The first hardware component 120-1 may be an integrated circuit, such as a memory device or processing device. The first hardware component 120-1 may be communicatively coupled to the system connector 110 to communicate with the host system. The first hardware component 120-1 may be communicatively coupled to the network controller 130. The second hardware component 120-2 may be a power device, such as a capacitor or battery. The second hardware component 120-2 may receive power from the system connector 110. The second hardware component 120-2 may provide power to the first hardware component 120-1 or the network controller 130.

The network controller 130 of the network adapter 100 is configured to send and receive communications from the host computer. The network controller 130 is also configured to send and receive network communication through the first network interface 140 by way of a first input/output (I/O) 132. The network controller 130 is also configured to send and receive network communication through the second network interface 150 by way of a second I/O 134. The network controller 130 includes logic configured to communicatively couple the host computer to the first network interface 140 and the second network interface 150. The network controller 130 may be an ASIC or other processing device designed to route network streams including one or more packets, to and from, a first network connection or a second network connection. The routing may include receiving network streams, sending network streams, and/or generating network streams of packets. The routing may be based on logic that is embedded within the network controller 130, from the first hardware component 120-1, or based on instructions contained within the data or metadata of the packets. The network controller 130 also includes test specific logic 136 for testing and verifying the functionality of the network adapter 130.

The first network interface 140 includes a first set of network pathways 142 and a first network socket 144. The first set of network pathways 142 and the first network socket 144 are physically and electrically coupled to the network adapter 100. The first set of network pathways 142 may be one or more pathways. For example, network pathways 142 may include a first network transmit pathway for transmission of packets to a network connection, and a first network receive pathway for receiving a stream of data from the network connection. The first network interface 140 may also include a first network cable 146. The first network cable 146 is removably coupled to the first network socket 144 by way of a plug (not depicted) of the first network cable. The first network interface 140 is configured to transmit packets to and receive packets from the controller 130. The first network interface 140 is also configured to establish a network connection with an external device, such as a network attached storage or a second computer, by transmitting packets to and receiving packets from the first network cable 146.

The second network interface 150 includes a second set of network pathways 152 and a second network socket 154. The second set of network pathways 152 and the second network socket 154 are physically and electrically coupled to the network adapter 100. The second set of network pathways 152 may be one or more pathways. For example, network pathways 152 may include a second network transmit pathway for transmission of packets to a network connection, and a second network receive pathway for receiving a stream of data from the network connection. The second network interface 150 may also include a second network cable 156. The second network cable 156 is removably coupled to the second network socket 154 by way of a plug (not depicted) of the second network cable. The second network interface 150 is configured to transmit packets to and receive packets from the controller 130. The second network interface 150 is also configured to establish a network connection with an external device, such as a switch or network printer, by transmitting packets to and receiving packets from the second network cable 156.

The first network interface 140 and the second network interface 150 are separate dedicated network lines. By being separate lines, the two network interfaces may not share any physical connection with each other such that once a network packet leaves one interface, the network packet cannot be accessed by the other interface. For example, the first network interface 140 may connect to a first router externally to the Internet and the second network interface 150 may connect to an internal hub. The network controller 130 may communicatively couple one or more clients hosted by the host computer via the first network interface 140 or the second network interface 150. For example, a host computer may operate by a hypervisor and may virtually host hundreds of clients.

The network adapter 100 also includes dedicated test hardware. The dedicated test hardware may perform tests or diagnostics regarding the performance of the network adapter 100 or subsystems of the network adapter, such as the first network interface 140, the second network interface 150, or any other component of the network adapter. The dedicated test hardware may include the following: one or more dedicated loopback pathways 160 and the test specific logic 136 of the controller 130. In some embodiments, the test specific logic 136 may be in a separate dedicated chip or package (not depicted) and may be connected with the other components of the system by way of one or more traces on the network adapter 100.

The dedicated loopback pathways 160 communicatively couple the plurality of network interfaces of the multiport network adapter 100 together. For example, the dedicated loopback pathways 160 communicatively couples the first network interface 140 to the second network interface 150. The dedicated loopback pathways 160 may be one or more traces or pathways directly affixed to the network adapter 100. The dedicated loopback pathways 160 may not share any pathways, logical or physical, with the first network interface 140 or with the second network interface 150.

The dedicated loopback pathways 160 may be unidirectional, such as configured to only send or receive packets but not the combination of sending and receiving network streams. The dedicated loopback pathways 160 may be bidirectional, such as configured to both send and receive network packets between network interfaces. The dedicated loopback pathways 160 may include a singular trace for sending and/or receiving a stream of networks. In some embodiments, the dedicated loopback pathways 160 include multiple traces including at least a first trace for sending data in one direction and at least a second trace for sending data in an opposite direction (e.g., send lanes, receive lanes).

The dedicated loopback pathways 160 may include multiple routes between various components of the network adapter 100. In detail, the dedicated loopback pathways 160 include a first route between the first I/O 132 and the first network socket 144. The first route includes one or more lanes for sending and receiving of packets. The dedicated loopback pathways 160 also include a second route between the first network socket 144 and the second network socket 154. The second route includes one or more lanes for sending and receiving of packets. The dedicated loopback pathways 160 also include a third route between the second I/O 134 and the second network socket 154.

The routes of the dedicated loopback pathways 160 may be utilized in total or in part. In a first example, for testing traffic that would be sent and received by the first network interface 140 to and from the first network cable 146 and that would be received and sent, respectively, by the second network interface 150 from and to the second network cable 146. In the first example, only the second route (that directly communicatively couples the first network socket 144 and the second network socket 154) of the dedicated loopback pathways 160 is utilized. Consequently, the second route of the dedicated loopback pathway 160 bypasses the first route, the third route, the first network cable 146, and the second network cable 156. Further, the second route of the dedicated loopback pathway 160 permits testing of the first I/O 132, the first set of network pathways 142, the first network socket 144, the second I/O 134, the second set of network pathways 152, and the second network socket 154.

In a second example, testing traffic of the first network interface 140 sent and received conventionally with the first network cable 146. The third route of the dedicated loopback pathways 160 directly transmits diagnostic traffic between the second I/O 134 and the second network socket 154. Continuing the second example, the second route of the dedicated loopback pathways 160 directly transmits diagnostic traffic between the second network socket 154 and the first network socket 144. The diagnostic traffic would then flow between the first network socket 144 and the first I/O 132 by way of the first set of network pathways 142. Consequently, the combined second and third routes of the dedicated loopback pathway 160 bypass the first route, the first network cable 146, the second set of network pathways 152, and the second network cable 156. Further, the combined second and third routes permit testing of the first I/O 132, the first set of network pathways 142, the first network socket 144, the second I/O 134, and the second network socket 154. This second example may be helpful if the second set of network pathways 152 is unresponsive or damaged. Similarly, and in a third example, the first and second routes would permit the testing of the second network interface 150 sent and received conventionally with the second network cable 156.

The test specific logic 136 of the network controller 130 analyzes the network traffic of the first network interface 140 and the second network interface 150. The test specific logic 136 also switches between an active network mode (where each network interface of the network adapter 100 is separate), and a testing mode (where the dedicated loopback pathways 160 connect two or more of the network interfaces together). The test specific logic 136 may switch between the active mode and the test mode based on an authentication or credential. (Active mode may include operating the network interfaces separately of each other and without communicatively coupling through and dedicated loopback pathways.) The authentication may be received from the host computer, stored in the hardware component 120-1, generated by the network controller 130, or received remotely from another computer (e.g., through one of the network interfaces). The test specific logic 136 or the network controller 130 may verify the authentication before permitting operation in the test mode.

The dedicated test hardware simulates the operation of the network adapter 100 consistent with a diagnostic scenario where a crossover cable or external network device is utilized to communicate from one network socket to another network socket. The dedicated loopback pathways 160 may be utilized without removing any existing network cables from any of the network sockets of the network adapter 100. For example, the network adapter 100 transmits and send packets between the first network socket 144 and the second network socket 154 without the removal or insertion of any new cables or hardware. This has the practical effect of allowing tests in a more rapid manner, and without the need for a person to be on site and physically touching the network adapter 100 or the host computer. The dedicated loopback pathways 160 may also be utilized without the presence of any additional cabling or hardware. Consequently, the dedicated test hardware provides a technical improvement by enabling testing and diagnostics before the network adapter 100 is connected to a live network.

Figure 2:
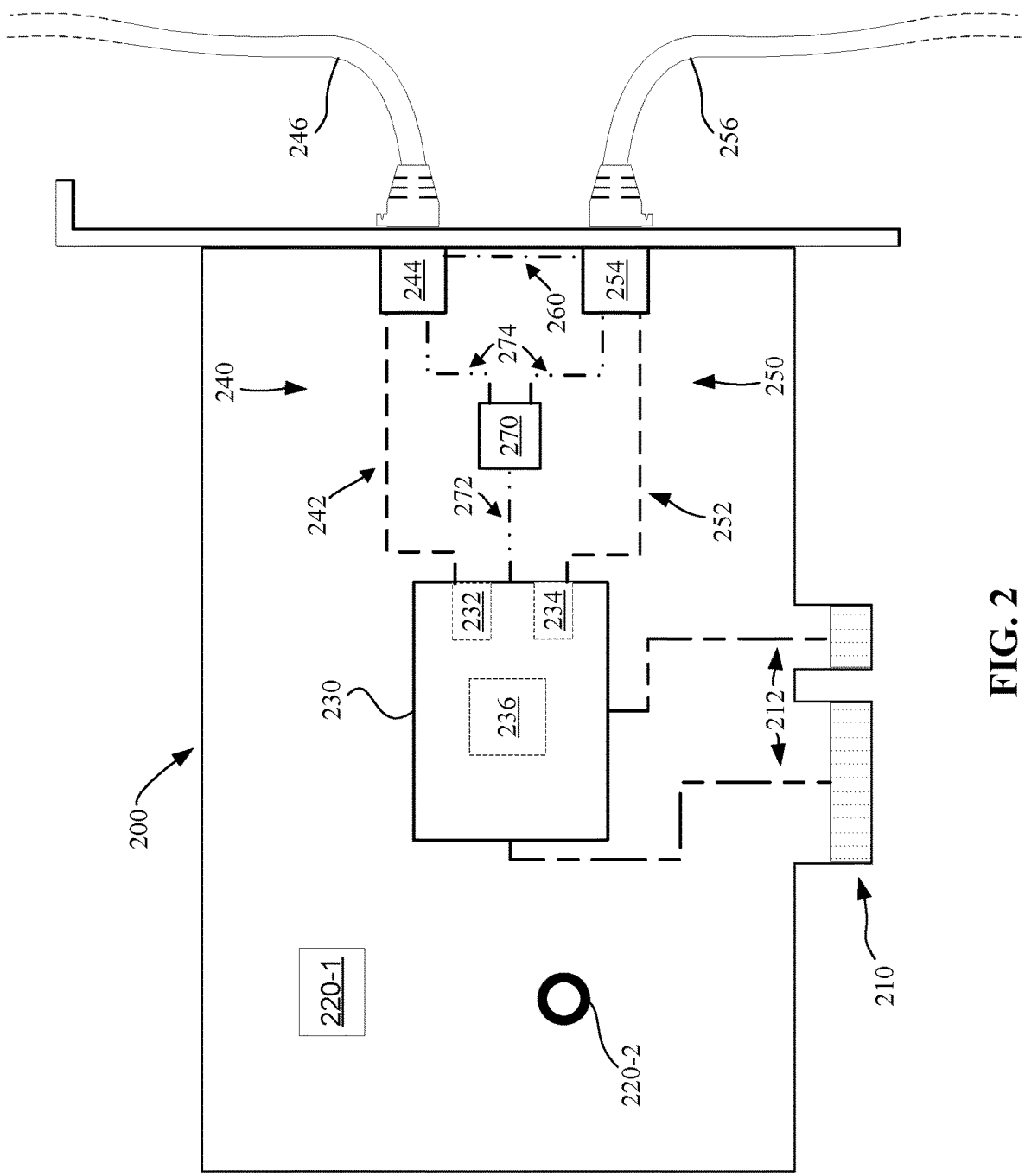
FIG. 2 depicts a second example network adapter configured to provide network testing consistent with embodiments of the present disclosure.

FIG. 2 depicts an example network adapter 200 configured to provide network testing consistent with embodiments of the present disclosure. The network adapter 200 includes dedicated testing hardware and operates both in an active network mode and a testing mode. The network adapter 200 is in the form of an expansion card on a printed circuit board (PCB) for receipt by a host computer (alternatively, computer, computer system, or host system). In some embodiments, a network adapter is integrally coupled to and forms part of a mainboard PCB along with a host computer. FIG. 5 describes an example computer system consistent with embodiments. The network adapter 200 includes the following: a system connector 210, one or more system pathways 212, hardware components 220-1 and 220-2 (collectively 220), and a network adapter controller (alternatively, adapter controller or network controller) 230. The network adapter 200 is a multiport network adapter and includes a first network interface 240 and a second network interface 250. In some embodiments, more interfaces (e.g., three separate network interfaces, eight discrete network interfaces) comprise the network adapter 200.

The system connector 210 of the network adapter 200 includes one or more physical contacts to couple the network adapter to a host system. The system connector 210 may include one or communication lanes (e.g., buses, pathways) configured to send and receive data from a host system. The system connector 210 may also include one or more power lanes configured to receive power for the components of the network adapter 200. The power may be provided by the host system. In some embodiments, the network adapter 200 receives power in another manner, such as through a dedicated internal or external power connector (not depicted).

The one or more system pathways 212 of the network adapter 200 are physical traces that serve to electrically couple the system connector 210 to the network controller 230. The system pathways 212 may also include additional pathways (not depicted) that electrically couple to the hardware components 220. The system pathways 212 may be configured to transmit power from the system connector 210 to the network controller 230 and/or the hardware components 220. The system pathways 212 may be configured to transmit communication to the system connector 210, the network controller 230, and/or the hardware components 220. The system pathways 212 may also be configured to transmit communications from the network controller 230 and/or the hardware components 220 to the system connector 210.

The hardware components 220 of the network adapter 200 include a first hardware component 220-1 and a second hardware component 220-2. The first hardware component 220-1 may be an integrated circuit, such as a memory device or processing device. The first hardware component 220-1 may be communicatively coupled to the system connector 210 to communicate with the host system. The first hardware component 220-1 may be communicatively coupled to the network controller 230. The second hardware component 220-2 may be a power device, such as a capacitor or battery. The second hardware component 220-2 may receive power from the system connector 210. The second hardware component 220-2 may provide power to the first hardware component 220-1 or the network controller 230.

The network controller 230 of the network adapter 200 is configured to send and receive communications from the host computer. The network controller 230 is also configured to send and receive network communication through the first network interface 240 by way of a first input/output (I/O) 232. The network controller 230 is also configured to send and receive network communication through the second network interface 250 by way of a second I/O 234. The network controller 230 includes logic configured to communicatively couple the host computer to the first network interface 240 and the second network interface 250. The network controller 230 may be an ASIC or other processing device designed to route network streams including one or more packets, to and from, a first network connection or a second network connection. The routing may include receiving network streams, sending network streams, and/or generating network streams of packets. The routing may be based on logic that is embedded within the network controller 230, from the first hardware component 220-1, or based on instructions contained within the data or metadata of the packets. The network controller 230 also includes test specific logic 236 for testing and verifying the functionality of the network adapter 230.

The first network interface 240 includes a first set of network pathways 242 and a first network socket 244. The first set of network pathways 242 and the first network socket 244 are physically and electrically coupled to the network adapter 200. The first set of network pathways 242 may be one or more pathways. For example, network pathways 242 may include a first network transmit pathway for transmission of packets to a network connection, and a first network receive pathway for receiving a stream of data from the network connection. The first network interface 240 may also include a first network cable 246. The first network cable 246 is removably coupled to the first network socket 244 by way of a plug (not depicted) of the first network cable. The first network interface 240 is configured to transmit packets to and receive packets from the controller 230. The first network interface 240 is also configured to establish a network connection with an external device, such as a network attached storage or a second computer, by transmitting packets to and receiving packets from the first network cable 246.

The second network interface 250 includes a second set of network pathways 252 and a second network socket 254. The second set of network pathways 252 and the second network socket 254 are physically and electrically coupled to the network adapter 200. The second set of network pathways 252 may be one or more pathways. For example, network pathways 254 may include a second network transmit pathway for transmission of packets to a network connection, and a second network receive pathway for receiving a stream of data from the network connection. The second network interface 250 may also include a second network cable 256. The second network cable 256 is removably coupled to the second network socket 254 by way of a plug (not depicted) of the second network cable. The second network interface 250 is configured to transmit packets to and receive packets from the controller 230. The second network interface 250 is also configured to establish a network connection with an external device, such as a switch or network printer, by transmitting packets to and receiving packets from the second network cable 256.

The first network interface 240 and the second network interface 250 are separate dedicated network lines. By being separate lines, the two network interfaces may not share any physical connection with each other such that once a network packet leaves the one interface, the network packet cannot be accessed by the other interface. For example, the first network interface 240 may connect to a first router externally to the Internet and the second network interface 250 may connect to an internal hub. The network controller 230 may communicatively couple one or more clients hosted by the host computer via the first network interface 240 or the second network interface 250. For example, a host computer may operate by a hypervisor and may virtually host hundreds of clients.

The network adapter 200 also includes dedicated test hardware. The dedicated test hardware may perform tests or diagnostics regarding the performance of the network adapter 200 or subsystems of the network adapter, such as the first network interface 240, the second network interface 250, or any other component of the network adapter. The dedicated test hardware may include the following: one or more dedicated loopback pathways 260, the test specific logic 236 of the controller 230, and a dedicated test circuit 270. In some embodiments, the test specific logic 236 may be in a separate dedicated chip or package (not depicted) and may be connected with the other components of the system by way of one or more traces on the network adapter 200.

The dedicated loopback pathways 260 communicatively couple the plurality of network interfaces of the multiport network adapter 200 together. For example, the dedicated loopback pathways 260 communicatively couples the first network interface 240 to the second network interface 250. The dedicated loopback pathways 260 may be one or more traces or pathways directly affixed to the network adapter 200. The dedicated loopback pathways 260 may not share any pathways, logical or physical, with the first network interface 240 or with the second network interface 250.

The dedicated loopback pathways 260 may be unidirectional, such as configured to only send or receive packets but not the combination of sending and receiving network streams. The dedicated loopback pathways 260 may be bidirectional, such as configured to both send and receive network packets between network interfaces. The dedicated loopback pathways 260 may include a singular trace for sending and/or receiving a stream of networks. In some embodiments, the dedicated loopback pathways 260 include multiple traces including at least a first trace for sending data in one direction and at least a second trace for sending data in an opposite direction (e.g., send lanes, receive lanes).

The test specific logic 236 of the network controller 230 analyzes the network traffic of the first network interface 240 and the second network interface 250. The test specific logic 236 also switches between an active network mode (where each network interface of the network adapter 200 is separate), and a testing mode (where the dedicated loopback pathways 260 connect two or more of the network interfaces together). The test specific logic 236 may switch between the active mode and the test mode based on an authentication or credential. (Active mode may include operating the network interfaces separately of each other and without communicatively coupling through and dedicated loopback pathways.) The authentication may be received from the host computer, stored in the hardware component 220-1, generated by the network controller 230, or received remotely from another computer (e.g., through one of the network interfaces). The test specific logic 236 or the network controller 230 may verify the authentication before permitting operation in the test mode.

The dedicated test circuit 270 is one or more circuits electrically coupled to one or more other components of the network adapter 200. The dedicated test circuit 270 may be as simple as a gate (e.g., a physical NOT gate). The dedicated test circuit may involve additional and more complex circuitry, such as a dedicated ASIC or FPGA, for performing tests on the network adapter 200. In some embodiments, the test specific logic 236 is embedded directly into the dedicated test circuit 270 and is not located in the controller 230.

The dedicated test circuit 270 may be connected to the network controller by one or more test lines. For example, test line 272 communicatively couples the dedicated test circuit 270 to the network controller 230. Continuing the example, second test lines 274 connect to the first network socket 244 and the second network socket 254. The dedicated test circuit 270, may receive from the network controller 230 and through the test line 272 a signal to operate in the active mode or the test mode. Upon receiving the signal to operate in the test mode, the dedicated test circuit 270 may send to the first network socket 244 and the second network socket 254 a second signal by the second test lines 274.

The first network socket 244 and the second network socket 254 may respond by routing traffic through the dedicated loopback pathways 260 and not outside of the network card. For example, the first network socket 244 may be modified or wired such that while receiving a signal from the dedicated test circuit 270, communication pins connected to the first network cable 246 are deactivated and communication pins connected to the dedicated loopback pathways 260 are activated. After losing signal from the dedicated test circuit 270, the communication pins connected to the first network cable 246 are reactivated and the communication pins connected to the dedicated loopback pathways 260 are deactivated. This may be accomplished by communicatively coupling the one or more pins to a gate (e.g., one or more NOT gates, a combination of OR gates and NOT gates) The second network socket 254 may operate similarly and may only send data to the second network cable 256 or the dedicated loopback pathways 260 responsive to the signal from the dedicated test circuit 270.

In some embodiments, in response to receiving from the network controller 230, the dedicated test circuit 270 verifies, or authenticates the operating signals. The dedicated test circuit 270 may operate in the active mode only until verifying that a test of the network adapter 200 is permitted. For example, the dedicated test circuit 270 defaults to the active mode upon receiving power from one or more components of the network adapter 200. Continuing the example, any dedicated loopback pathways including dedicated loopback pathways 260 operate in a disabled state upon receiving power from one or more components of the network adapter 200. Finalizing the example, only in response to an authorized command, would any dedicated loopback pathways operate in an enabled state.

The dedicated test hardware simulates the operation of the network adapter 200 consistent with a diagnostic scenario where a crossover cable or external network device is utilized to communicate from one network socket to another network socket. The dedicated loopback pathways 260 may be utilized without removing any existing network cables from any of the network sockets of the network adapter 200. For example, the network adapter 200 transmits and send packets between the first network socket 244 and the second network socket 254 without the removal or insertion of any new cables or hardware. This has the practical effect of allowing tests in a more rapid manner, and without the need for a person to be on site and physically touching the network adapter 200 or the host computer. The dedicated loopback pathways 260 may also be utilized without the presence of any additional cabling or hardware. Consequently, the dedicated test hardware provides a technical improvement by enabling testing and diagnostics before the network adapter 200 is connected to a live network.

Figure 3:
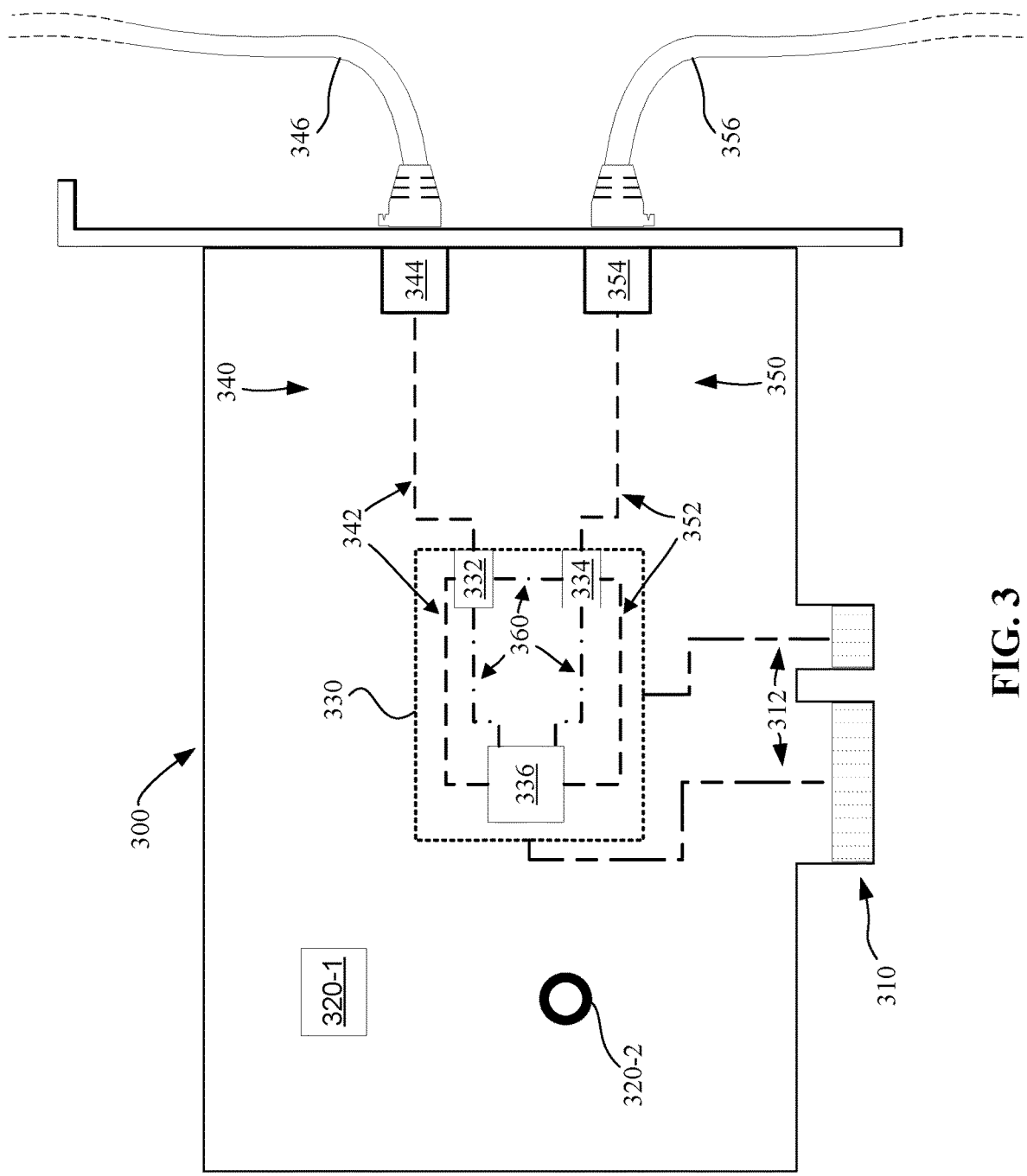
FIG. 3 depicts a third example network adapter configured to provide network testing consistent with embodiments of the present disclosure.

FIG. 3 depicts an example network adapter 300 configured to provide network testing consistent with embodiments of the present disclosure. The network adapter 300 includes dedicated testing hardware and operates both in an active network mode and a testing mode. The network adapter 300 is in the form of an expansion card on a printed circuit board (PCB) for receipt by a host computer (alternatively, computer, computer system, or host system). In some embodiments, a network adapter is integrally coupled to and forms part of a mainboard PCB along with a host computer. FIG. 5 describes an example computer system consistent with embodiments. The network adapter 300 includes the following: a system connector 310, one or more system pathways 312, hardware components 320-1 and 320-2 (collectively 320), and a network adapter controller (alternatively, adapter controller or network controller) 330. The network adapter 300 is a multiport network adapter and includes a first network interface 340 and a second network interface 350. In some embodiments, more interfaces (e.g., three separate network interfaces, five discrete network interfaces) comprise the network adapter 300.

The system connector 310 of the network adapter 300 includes one or more physical contacts to couple the network adapter to a host system. The system connector 310 may include one or communication lanes (e.g., buses, pathways) configured to send and receive data from a host system. The system connector 310 may also include one or more power lanes configured to receive power for the components of the network adapter 300. The power may be provided by the host system. In some embodiments, the network adapter 300 receives power in another manner, such as through a dedicated internal or external power connector (not depicted).

The one or more system pathways 312 of the network adapter 300 are physical traces that serve to electrically couple the system connector 310 to the network controller 330. The system pathways 312 may also include additional pathways (not depicted) that electrically couple to the hardware components 320. The system pathways 312 may be configured to transmit power from the system connector 310 to the network controller 330 and/or the hardware components 320. The system pathways 312 may be configured to transmit communication to the system connector 310, the network controller 330, and/or the hardware components 320. The system pathways 312 may also be configured to transmit communications from the network controller 330 and/or the hardware components 320 to the system connector 310.

The hardware components 320 of the network adapter 300 include a first hardware component 320-1 and a second hardware component 320-2. The first hardware component 320-1 may be an integrated circuit, such as a memory device or processing device. The first hardware component 320-1 may be communicatively coupled to the system connector 310 to communicate with the host system. The first hardware component 320-1 may be communicatively coupled to the network controller 330. The second hardware component 320-2 may be a power device, such as a capacitor or battery. The second hardware component 320-2 may receive power from the system connector 310. The second hardware component 320-2 may provide power to the first hardware component 320-1 or the network controller 330.

The network controller 330 of the network adapter 300 is configured to send and receive communications from the host computer. The network controller 330 is also configured to send and receive network communication through the first network interface 340 by way of a first input/output (I/O) 332. The network controller 330 is also configured to send and receive network communication through the second network interface 350 by way of a second I/O 334. The network controller 330 includes logic configured to communicatively couple the host computer to the first network interface 340 and the second network interface 350. The network controller 330 may be an ASIC or other processing device designed to route network streams including one or more packets, to and from, a first network connection or a second network connection. The routing may include receiving network streams, sending network streams, and/or generating network streams of packets. The routing may be based on logic that is embedded within the network controller 330, from the first hardware component 320-1, or based on instructions contained within the data or metadata of the packets. The network controller 330 also includes test specific logic 336 for testing and verifying the functionality of the network adapter 330.

The first network interface 340 includes a first set of network pathways 342 and a first network socket 344. The first set of network pathways 342 and the first network socket 344 are physically and electrically coupled to the network adapter 300. The first set of network pathways 342 are both internal to the network controller 330 (traces or lines within the network controller) as well as external to the network controller 330 (traces or lines on the PCB of the network adapter 300). The first set of network pathways 342 may originate from or pass through the test specific logic 336, such that the test specific logic controls flow of data to the first network interface 340.

The first set of network pathways 342 may be one or more pathways. For example, network pathways 342 may include a first network transmit pathway for transmission of packets to a network connection, and a first network receive pathway for receiving a stream of data from the network connection. The first network interface 340 may also include a first network cable 346. The first network cable 346 is removably coupled to the first network socket 344 by way of a plug (not depicted) of the first network cable. The first network interface 340 is configured to transmit packets to and receive packets from the controller 330. The first network interface 340 is also configured to establish a network connection with an external device, such as a network terminal interface or a blade server, by transmitting packets to and receiving packets from the first network cable 346.

The second network interface 350 includes a second set of network pathways 352 and a second network socket 354. The second set of network pathways 352 and the second network socket 354 are physically and electrically coupled to the network adapter 300. The second set of network pathways 352 are both internal to the network controller 330 (traces or lines within the network controller) as well as external to the network controller 330 (traces or lines on the PCB of the network adapter 300. The second set of network pathways 352 may originate from or pass through the test specific logic 336, such that the test specific logic controls flow of data to the second network interface 350.

The second set of network pathways 352 may be one or more pathways. For example, network pathways 352 may include a second network transmit pathway for transmission of packets to a network connection, and a second network receive pathway for receiving a stream of data from the network connection. The second network interface 350 may also include a second network cable 356. The second network cable 356 is removably coupled to the second network socket 354 by way of a plug (not depicted) of the second network cable. The second network interface 350 is configured to transmit packets to and receive packets from the controller 330. The second network interface 350 is also configured to establish a network connection with an external device, such as a switch or network printer, by transmitting packets to and receiving packets from the second network cable 356.

The first network interface 340 and the second network interface 350 are separate dedicated network lines. By being separate lines, the two network interfaces may not share any physical connection with each other such that once a network packet leaves the one interface, the network packet cannot be accessed by the other interface. For example, the first network interface 340 may connect to a first router externally to the Internet and the second network interface 350 may connect to an internal hub. The network controller 330 may communicatively couple one or more clients hosted by the host computer via the first network interface 340 or the second network interface 350. For example, a host computer may operate by a hypervisor and may virtually host hundreds of clients.

The network adapter 300 also includes dedicated test hardware. The dedicated test hardware may perform tests or diagnostics regarding the performance of the network adapter 300 or subsystems of the network adapter, such as the first network interface 340, the second network interface 350, or any other component of the network adapter. The dedicated test hardware may include the following: one or more dedicated loopback pathways 360, and the test specific logic 336 of the controller 330. In some embodiments, the test specific logic 336 may be in a separate dedicated chip or package (not depicted) and may be connected with the other components of the system by way of one or more traces on the network adapter 300.

The dedicated loopback pathways 360 communicatively couples the plurality of network interfaces of the multiport network adapter 300 together. For example, the dedicated loopback pathways 360 communicatively couples the first network interface 340 to the second network interface 350 at the first I/O 332 and the second I/O 334, respectively. The dedicated loopback pathways 360 may be one or more traces or pathways directly embedded within the network controller 330. The dedicated loopback pathways 360 may not share any pathways, logical or physical, with the first network interface 340 or with the second network interface 350.

The dedicated loopback pathways 360 may be unidirectional, such as configured to only send or receive packets but not the combination of sending and receiving network streams. The dedicated loopback pathways 360 may be bidirectional, such as configured to both send and receive network packets between network interfaces. The dedicated loopback pathways 360 may include a singular trace for sending and/or receiving a stream of networks. In some embodiments, the dedicated loopback pathways 360 include multiple traces including at least a first trace for sending data in one direction and at least a second trace for sending data in an opposite direction (e.g., send lanes, receive lanes).

The test specific logic 336 of the network controller 330 analyzes the network traffic of the first network interface 340 and the second network interface 350. The test specific logic 336 also switches between an active network mode (where each network interface of the network adapter 300 is separate), and a testing mode (where the dedicated loopback pathways 360 connect two or more of the network interfaces together). The test specific logic 336 may switch between the active mode and the test mode based on an authentication or credential. (Active mode may include operating the network interfaces separately of each other and without communicatively coupling through and dedicated loopback pathways.) The authentication may be received from the host computer, stored in the hardware component 320-1, generated by the network controller 330, or received remotely from another computer (e.g., through one of the network interfaces). The test specific logic 336 or the network controller 330 may verify the authentication before permitting operation in the test mode.

The first I/O 332 and the second I/O 334 may respond by routing traffic through the dedicated loopback pathways 360 and not outside of the network controller 330. For example, the first I/O 332 may be modified or wired such that while receiving a signal from the dedicated test specific logic 336, communication pins connected to the first network cable 346 are deactivated and communication pins connected to the dedicated loopback pathways 360 are activated. After receiving a second signal from the test specific logic 336, the communication pins connected to the first network cable 346 are reactivated and the communication pins connected to the dedicated loopback pathways 360 are deactivated. This may be accomplished by communicatively coupling the one or more pins to a gate (e.g., one or more NOT gates, a combination of OR gates and NOT gates) The second I/O 334 may operate similarly and may only send data to the second network cable 356 or the dedicated loopback pathways 360 responsive to the signal from the test specific logic 336.

The dedicated test hardware simulates the operation of the network adapter 300 consistent with a diagnostic scenario where a crossover cable or external network device is utilized to communicate from one network socket to another network socket. The dedicated loopback pathways 360 may be utilized without removing any existing network cables from any of the network sockets of the network adapter 300. For example, the network adapter 300 transmits and send packets between the first network socket 344 and the second network socket 354 without the removal or insertion of any new cables or hardware. This has the practical effect of allowing tests in a more rapid manner, and without the need for a person to be on site and physically touching the network adapter 300 or the host computer. The dedicated loopback pathways 360 may also be utilized without the presence of any additional cabling or hardware. Consequently, the dedicated test hardware provides a technical improvement by enabling testing and diagnostics before the network adapter is connected to a live network. It should be appreciated by one skilled in the art, that one or more of the embodiments discussed in the figures are interchangeable, such as the multiple routes discussed in FIG. 1, combined with the dedicated lest logic of FIG. 2, and the internal logic of FIG. 3.

Figure 4:
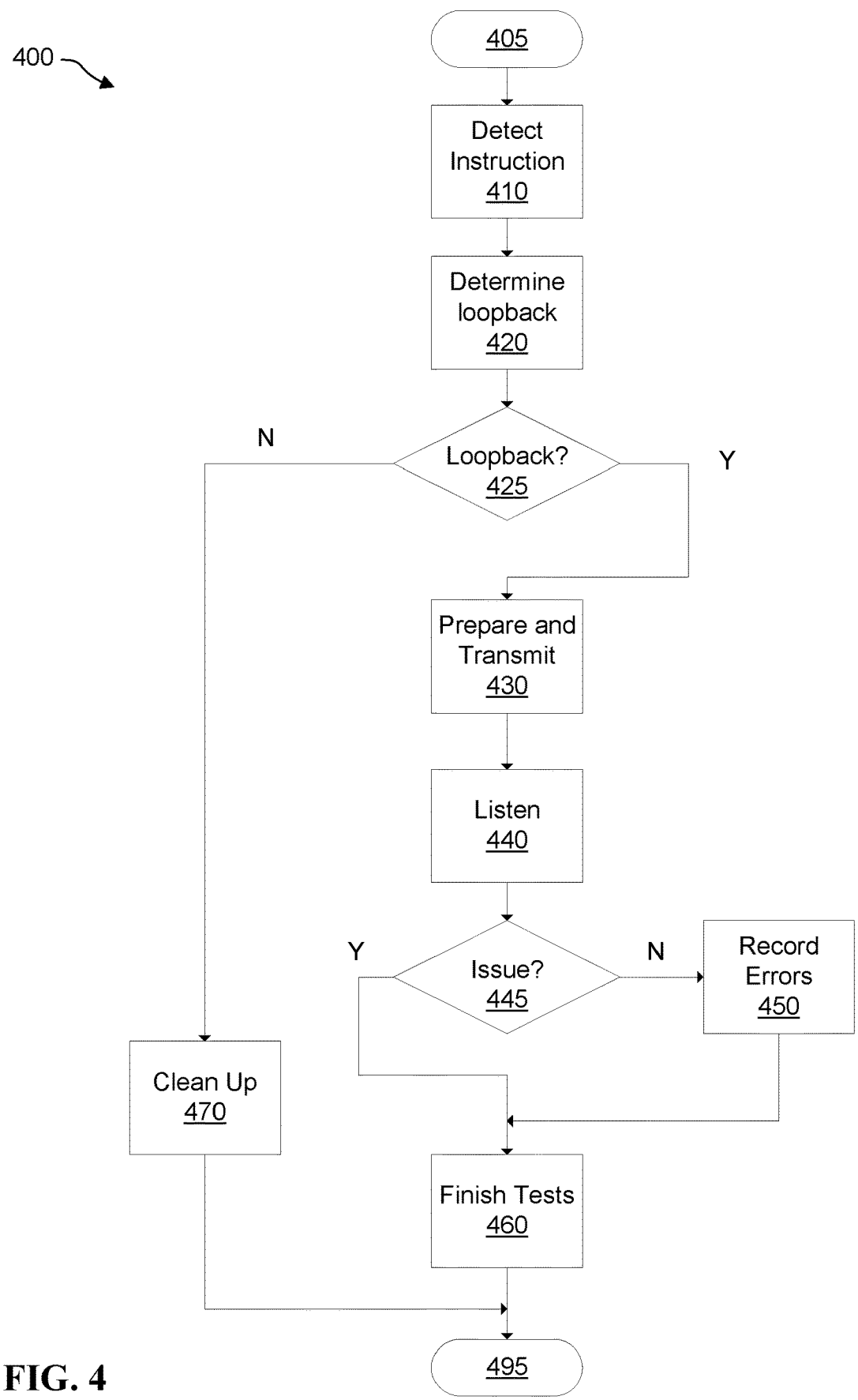
FIG. 4 depicts an example method to perform testing consistent with embodiments of the present disclosure.

FIG. 4 depicts an example method 400 to perform testing consistent with embodiments of the present disclosure. Method 400 may be performed by a network adapter, such as a multiport network adapter. Network adapters capable of performing method 400 may be found in FIG. 1, FIG. 2, and FIG. 3. One or more steps of method 400 may be embedded in firmware of or otherwise stored by a network adapter. Method 400 may be performed by a host computer, such as a server computer having a plurality of network adapters including a multiport network adapter having dedicated test hardware. FIG. 5 describes a computer system capable of performing one or more steps of method 400. The host computer may operate as a singular operating system or may operate as a hypervisor hosting a plurality of virtual operating systems.

Method 400 may be embedded into a device driver, the driver configured to perform one or more steps of method 400. Method 400 may be performed by a management console locally connected to a host computer and having elevated privileges (e.g., higher privileges than remote users, higher privileges than a hosted virtual system). Method 400 may be received by a host computer from another network adapter (a second network adapter separate from a network adapter comprising dedicated loopback hardware) from a remote location. Method 400 may be performed by an adjunct or indirect or privileged daemon, job, or service that communicates with or forms a portion of a hypervisor. Certain steps may be performed by one or more entities in conjunction or separately (e.g., certain steps performed by a network adapter and other steps performed by a host computer, certain steps performed by both a network adapter and a host system hardware/software jointly).

Method 400 begins, at start 405, by detecting an instruction directed towards the network adapter at 410. The detection at 410 may include receiving one or more signals indicative that the network adapter should begin operation. The instruction may be received through a system bus and from a host computer (e.g., from a hypervisor, from an operating system). The instruction may be received remotely through a network connection hosted by the network adapter. The instruction may be detected internally, such as based on determining there is no active network traffic or after the network adapter is idle for a period of time (e.g., 20 seconds, 15 minutes). The instruction may include a loopback test or may just be an instruction to perform a first test and the contents of the test may be stored within the network adapter. The instruction may include an identifier that may be used to authenticate the instruction.

At 420 it is determined that the network adapter should operate in a loopback mode. The determination, at 420, includes verifying that there is no active network traffic on one or more of the network interfaces of the network adapter. The determination, at 420, may include authenticating the detected instruction. The authentication may include verifying the source of the detected instruction (e.g., a first user, a first computer system, a first logical partition within a host computer, an entity with elevated privileges). The authentication may include verifying the detected instruction against a whitelist stored in the hypervisor or stored in the network adapter.

If it is determined that the network adapter should operate in the loopback mode at 425, the network adapter prepares and transmits data through a first network interface at 430. Preparing to transmit data may include selecting a first network interface specified in the detected instruction. Preparing to transmit data may also include waiting for any active traffic to finish flowing through the first network interface. Preparing to transmit data may also include reconfiguring the network adapter, such as selecting a dedicated loopback pathway and deactivating the external network portion of the first network interface. The data transmitted, at 430, includes one or more streams of network data (e.g., packets, signals, data). The data transmitted, at 430, may include a plurality of test packets designed specifically or performing network tests. The data transmitted, at 430, may include active network data, such as recent network data buffered by the host system or the network adapter. The data transmitted, at 430, may pass through a dedicated loopback pathway between the first network interface and a second network interface.

At 440, the network adapter listens on a second network interface. The listening, at 440, may include listening on a network interface specified in the detected instruction. The listening, at 440, may include listening on an idle or inactive second network interface. The listening, at 440, may include reconfiguring the second network interface to utilize the dedicated loopback pathway and shutting down the flow of the external network portion of the second network interface. The listening, at 440, may include comparing the received data with the data transmitted at 430. The listening, at 440, may include comparing the time the data was received with the time the data was transmitted at 430.

If the received data has issues at 445, any errors are recorded at 450 (e.g., some data is missing, some data is scrambled, or any other issue of a network adapter or a network interface). If the received data does not have any issues at 445, the testing is finalized at 460. Finalizing of tests, at 460, may include performing and calculation or comparisons between the sent and received data. Finalizing of the tests, at 460, may include transmitting the traffic received to a host computer. Finalizing of the tests, at 460, may include transmitting the calculations and comparisons to the host computer. Finalizing of the tests, at 460, may include reconfiguring the network interfaces such that the dedicated loopback pathway is deactivated. For example, finalizing tests, at 460, may include resetting any dedicated circuitry or communication lines such that the multiple network interfaces are communicatively separate from each other. Finalizing of the tests, at 460, may include performing additional network adapter tests such a single network interface loopback through a transmit and receive line of a first network interface.

After tests are finalized, at 460, method 400 ends at 495. If it is determined that the network adapter should not operate in the loopback mode at 425, the detected instruction is cleaned up at 470, and then method 400 ends at 495. The clean-up at 470 may include flagging the detected instruction as an unauthorized or unauthenticated instruction. The clean-up, at 470, may include the network adapter ignoring the detected instruction. The clean-up, at 470, may include communicating to the host computer that active network traffic is currently present and that a delay or cancelation of the detected instruction was performed. The clean-up, at 470, may include providing the flagged detected instruction to the host computer.

The clean-up, at 470, may include determining that the network adapter is frozen or unresponsive or that the network adapter is responsive but is stuck in a test mode and can no longer communicate with an active network. The clean-up, at 470, may include rebooting, resetting, or restarting, or power cycling the network adapter such that the network adapter reinitializes and begins operating in an active mode. For example, a server removes power from a Peripheral Connect Interface (PCI) slot where the network adapter is installed for 30 seconds. The power cycling of the network adapter may be performed in response to determining the network adapter is unresponsive or that the network adapter is stuck in the test mode.

FIG. 5 depicts the representative major components of an example computer system 501 that may be used, in accordance with embodiments of the present disclosure. It is appreciated that individual components may vary in complexity, number, type, and\or configuration. The particular examples disclosed are for example purposes only and are not necessarily the only such variations. The computer system 501 may comprise a processor 510, memory 520, an input/output interface (herein I/O or I/O interface) 530, and a main bus 540. The main bus 540 may provide communication pathways for the other components of the computer system 501. In some embodiments, the main bus 540 may connect to other components such as a specialized digital signal processor (not depicted).

The processor 510 of the computer system 501 may be comprised of one or more cores 512A, 512B, 512C, 512D (collectively 512). The processor 510 may additionally include one or more memory buffers or caches (not depicted) that provide temporary storage of instructions and data for the cores 512. The cores 512 may perform instructions on input provided from the caches or from the memory 520 and output the result to caches or the memory. The cores 512 may be comprised of one or more circuits configured to perform one or more methods consistent with embodiments of the present disclosure. In some embodiments, the computer system 501 may contain multiple processors 510. In some embodiments, the computer system 501 may be a single processor 510 with a singular core 512.

The memory 520 of the computer system 501 may include a memory controller 522. In some embodiments, the memory 520 may comprise a random-access semiconductor memory, storage device, or storage medium (either volatile or non-volatile) for storing data and programs. In some embodiments, the memory may be in the form of modules (e.g., dual in-line memory modules). The memory controller 522 may communicate with the processor 510, facilitating storage and retrieval of information in the memory 520. The memory controller 522 may communicate with the I/O interface 530, facilitating storage and retrieval of input or output in the memory 520.

The I/O interface 530 may comprise an I/O bus 550, a terminal interface 552, a storage interface 554, an I/O device interface 556, and a network interface 558. The I/O interface 530 may connect the main bus 540 to the I/O bus 550. The I/O interface 530 may direct instructions and data from the processor 510 and memory 520 to the various interfaces of the I/O bus 550. The I/O interface 530 may also direct instructions and data from the various interfaces of the I/O bus 550 to the processor 510 and memory 520. The various interfaces may include the terminal interface 552, the storage interface 554, the I/O device interface 556, and the network interface 558. In some embodiments, the various interfaces may include a subset of the aforementioned interfaces (e.g., an embedded computer system in an industrial application may not include the terminal interface 552 and the storage interface 554).

Logic modules throughout the computer system 501—including but not limited to the memory 520, the processor 510, and the I/O interface 530—may communicate failures and changes to one or more components to a hypervisor or operating system (not depicted). The hypervisor or the operating system may allocate the various resources available in the computer system 501 and track the location of data in memory 520 and of processes assigned to various cores 512. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising: detecting an instruction directed towards a network adapter, wherein the network adapter including a plurality of network ports communicatively coupled to the adapter by a plurality of network interfaces, wherein each of the network ports is configured to communicate with an external network cable of a plurality of external network cables; determining, based on the detected instruction, the network adapter should operate in a loopback mode; transmitting, based on the determination and on a first network interface of the plurality of network interfaces of the network adapter, one or more network signals through a dedicated loopback pathway, wherein the dedicated loopback pathway connects to a second network interface of the network adapter, wherein the dedicated loopback pathway is formed by including one or more resources of the first network interface and one or more resources of the second network interface; listening, for the one or more network signals, on the dedicated loopback pathway; and performing, based on the listening for the one or more network signals, a network loopback test of the network adapter.

2. The method of claim 1, wherein the first network interface is configured to provide network traffic to a first network connection, and wherein the second network interface is configured to provide network traffic to a second network connection, and wherein the network adapter includes a plurality of additional network pathways including a first network transmit pathway and a first network receipt pathway of the first network interface and a second network transmit pathway and a second network receipt pathway of the second network interface, and wherein the dedicated loopback pathway is separate from one or more of the plurality of additional network pathways.

3. The method of claim 2, wherein the one or more network signals are a first one or more network signals, wherein the method further comprises: sending, a second set of one or more network signals, to the first network transmit pathway of the first network interface; listening, for the sent second set of one or more network signals, from the first network receipt pathway of the first network interface; and performing, based on the listening for the second set of one or more network signals, a second network loopback test of the network adapter.

4. The method of claim 3, wherein the method further comprises: identifying, based on the performing the network loopback test and based on the performing the second network loopback test, an issue with the first network interface.

5. The method of claim 2, wherein the dedicated loopback pathway does not share any pathways with the first network interface, and wherein the dedicated loopback pathway connects to the second network interface before the first network connection and before the second network connection.

6. The method of claim 5, wherein the dedicated loopback pathway does not share any pathways with the second network interface, and wherein the dedicated loopback pathway connects to the first network interface before the second network connection and before the first network connection.

7. The method of claim 1, wherein the method further comprises: identifying, based on the performing the network loopback test, an issue with the first network interface.

8. The method of claim 1, wherein the method further comprises: identifying an issue, wherein the issue is selected from a group consisting of an issue with the first network interface and an issue with the second network interface.

9. The method of claim 1, wherein the network adapter includes a network adapter chip, and wherein the dedicated loopback pathway is internal to the network adapter chip.

10. The method of claim 1, wherein the dedicated loopback pathway has a disabled state and an enabled state, and wherein the network adapter defaults to a disabled state upon receiving power from a host computer, and wherein the method further comprises: changing, based on determining the network adapter should operate in the loopback mode, the dedicated loopback pathway from the disabled state to the enabled state.

11. The method of claim 10, wherein the method further comprises: resetting, after the performing the network loopback test of the network adapter, the dedicated loopback pathway to the disabled state.

12. The method of claim 1, wherein the dedicated loopback pathway has a disabled state and an enabled state, and wherein the network adapter defaults to a disabled state upon receiving power from a host computer, and wherein the method further comprises: receiving, an unauthenticated instruction, the unauthenticated instruction directed towards the network adapter.

13. The method of claim 12, wherein the method further comprises: ignoring the unauthenticated instruction.

14. The method of claim 12, wherein the method further comprises: providing the unauthenticated instruction to the host computer.

15. The method of claim 1, wherein the determining the network adapter should operate in the loopback mode is performed by the network adapter.

16. A system, the system comprising: a memory, the memory containing one or more instructions; and a processor, the processor communicatively coupled to the memory, the processor, in response to reading the one or more instructions, configured to: detect an instruction directed towards a network adapter, wherein the network adapter including a plurality of network ports, wherein the network adapter is configured with a plurality of network interfaces, wherein each of the network ports is configured to communicate with an external network cable of a plurality of external network cables, wherein each network interface includes at least one dedicated transmit pathway and at least one dedicated receive pathway; determine, based on the detected instruction, the network adapter should operate in a loopback mode; transmit, based on the determination and on a first network interface of the plurality of network interfaces of the network adapter, one or more network signals through a dedicated loopback pathway, wherein the dedicated loopback pathway connects to a second network interface of the network adapter, wherein the dedicated loopback pathway is formed by including a dedicated transmit pathway from one of the plurality of network interfaces and a dedicated receive pathway from another of the plurality of network interfaces; listen, for the one or more network signals, on the dedicated loopback pathway; and perform, based on the listening for the one or more network signals, a network loopback test of the network adapter.

17. The system of claim 16, wherein the processor is further configured to: identify an issue, wherein the issue is selected from a group consisting of an issue with the first network interface and an issue with the second network interface.

18. The system of claim 16, wherein the network adapter includes a network adapter chip, and wherein the dedicated loopback pathway is internal to the network adapter chip.

19. A computer program product, the computer program product comprising a computer readable storage medium having program instructions embodied therewith, the program instructions configured to: detect an instruction directed towards a network adapter, wherein the network adapter including a plurality of network ports communicatively coupled to the adapter by a plurality of network interfaces, wherein each of the network ports is configured to communicate with an external network cable of a plurality of external network cables; determine, based on the detected instruction, the network adapter should operate in a loopback mode; transmit, based on the determination and on a first network interface of the plurality of network interfaces of the network adapter, one or more network signals through a dedicated loopback pathway, wherein the dedicated loopback pathway is configured to connect to a second network interface of the network adapter, wherein the dedicated loopback pathway is formed by including one or more resources of the first network interface and one or more resources of the second network interface; listen, for the one or more network signals, on the dedicated loopback pathway; and perform, based on the listening for the one or more network signals, a network loopback test of the network adapter.

20. The computer program product of claim 19, wherein the dedicated loopback pathway has a disabled state and an enabled state, and wherein the network adapter defaults to a disabled state upon receiving power from a host computer, and wherein the program instructions are further configured to: change, based on determining the network adapter should operate in the loopback mode, the dedicated loopback pathway from the disabled state to the enabled state.

* * * * *